(12) United States Patent
Cuttner

(10) Patent No.: US 8,497,939 B2
(45) Date of Patent: Jul. 30, 2013

(54) METHOD AND PROCESS FOR TEXT-BASED ASSISTIVE PROGRAM DESCRIPTIONS FOR TELEVISION

(75) Inventor: Craig Davis Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 858 days.

(21) Appl. No.: 12/330,242

(22) Filed: Dec. 8, 2008

(65) Prior Publication Data

US 2010/0141834 A1 Jun. 10, 2010

(51) Int. Cl.
*H04N 7/00* (2006.01)
*H04N 11/00* (2006.01)

(52) U.S. Cl.
USPC .................................. 348/468; 348/62; 348/63

(58) Field of Classification Search
USPC ........................................................ 348/62, 63
See application file for complete search history.

(56) References Cited

U.S. PATENT DOCUMENTS

| | | | |
|---|---|---|---|
| 6,271,892 B1 * | 8/2001 | Gibbon et al. | 348/700 |
| 7,617,272 B2 * | 11/2009 | Bulson et al. | 709/203 |
| 7,631,326 B2 * | 12/2009 | Kaneko | 725/32 |
| 2004/0044532 A1 * | 3/2004 | Karstens | 704/271 |
| 2004/0143430 A1 | 7/2004 | Said et al. | |
| 2007/0011012 A1 | 1/2007 | Yurick et al. | |
| 2007/0027844 A1 * | 2/2007 | Toub et al. | 707/3 |

OTHER PUBLICATIONS

International Search Report dated Jan. 26, 2010 issued in corresponding PCT Application No. PCT/US09/65311.

* cited by examiner

*Primary Examiner* — Mohamed Ibrahim
(74) *Attorney, Agent, or Firm* — Kenyon & Kenyon LLP

(57) ABSTRACT

In a system and method of producing time-synchronous textual descriptions of stage directions in live or pre-recorded productions to provide assistive program descriptions to visually-impaired consumers, a processor may parse stage directions from a production script and synchronize the parsed stage directions with closed captioning streams. The method may include viewing a live or pre-recorded production, creating textual descriptions of the stage directions using a stenography system, and outputting the textual descriptions to a separate output stream than that of dialogue descriptions. In addition, the method may include creating audio descriptions of the stage directions, and converting the audio descriptions to textual descriptions of the stage directions using a voice-recognition system. Further, the method may include distributing the synchronized stage directions, and receiving and decoding the synchronized stage directions using a text-based system.

10 Claims, 8 Drawing Sheets
METHOD AND PROCESS FOR TEXT-BASED ASSISTIVE PROGRAM DESCRIPTIONS FOR TELEVISION

FIELD OF THE INVENTION

The present invention relates to a method and process for producing and/or distributing text-based assistive services to television viewers.

BACKGROUND INFORMATION

In order to provide media content, such as content including video and/or audio, to the aurally or visually impaired, various techniques have been conventionally used. In this regard, video content may include pictures, motion pictures, animation, and other content, and audio content may include dialogue, music, sound effects, and other content. Such content may be difficult to provide to the aurally or visually impaired in a manner in which the user can practically perceive the provided information of the content.

For the aurally-impaired, video content is conventionally supplemented with closed captioning in order to provide relatively complete media content to such users. Closed captioning provides on-screen text representing the audio content with varying specificity. For example, closed captioning can represent one or more of dialogue, music, sound effects, and other components of audio content. As shown in FIG. 1, a conventional closed captioning system may include a stenographer 3, who listens to either a live or pre-recorded production 1. While listening, the stenographer 3 creates a closed captioning stream 5 based on the audio content.

Two types of closed captioning are paint-on closed captioning and pop-on closed captioning. Paint-on closed captioning is the more frequently implemented type of closed-captioning. In paint-on closed captioning, a stenographer 3 listens to a production and records, in real-time, the closed captioning stream 5, e.g., during a live broadcast of a television program or sporting event. As the stenographer 3 records the closed captioning stream 5, the stream is "painted-on" to a user's display device. As a result of the real-time creation of paint-on closed captioning, users generally experience a delay between receiving the video content and receiving the paint-on closed captioning stream which corresponds to the audio content associated with the received video.

In contrast, pop-on closed captioning typically includes the closed captioning stream 5 and an associated command that directs a display device to "pop-on" the closed captioning stream 5 at the appropriate time. Thus, pop-on closed captioning requires some programming prior to distribution to users in order to record and accurately time the "pop-on" commands. As a result of this additional programming, pop-on closed captioning may be synchronously displayed with the corresponding video content.

With either type of closed captioning, the closed captioning stream 5 may be distributed 7 to users by closed captioning systems, such as, for example, CEA-608 or CEA-708. When viewing a particular program at a viewing location 8, the program may be displayed together with the on-screen closed captioning 9. In this manner, aurally-impaired users may be able to perceive information provided in an audio portion of media content.

For the visually-impaired, audio content may be supplemented with an additional audio-based description of video content in order to provide relatively complete media content to such users. The additional audio-based description may provide an audio description of varying specificity of the video content, including, for example, actions, movements, locations, scenery, and expressions. As shown in FIG. 2, a conventional audio-based video description service may include a narrator 4 who records an audio track 6 of video content while either reading a production script 2 or viewing a live or pre-recorded production 1. The audio track 6 may then be distributed 12 to users by, for example, traditional broadcast TV, cable, satellite, telco, or recorded media such as DVD, Blu-Ray, or videocassette. When listening to a particular program at a viewing location 8, the program may then be played together with the audio track 6. In this manner, visually-impaired users may be able to perceive information provided in a video portion of media content.

However, conventional audio-based video description services are time-consuming and expensive in their production processes. For example, in order to create such audio-based video descriptions, one or more narrators must view entire productions and record audio tracks of the video content. In addition, production entities are often required to use the expensive services of professional narrators.

Moreover, the narrator recordings of audio tracks based on the production scripts or pre-recorded programs adds another step to the production process, adding additional time and cost. Nevertheless, this process is often used since it enables narrators to create audio tracks with greater detail and accuracy, since it may be possible to start, stop, delete, add, re-record, and otherwise edit all or portions of the audio tracks.

The alternative process of the narrators recording the audio tracks during live production is also often used. This process adds additional complexity to the live production process. This live process also results in audio tracks with less detail and accuracy than the alternative method, since the narrators may have only a single opportunity to record the audio tracks during live production.

Further, the distribution of the audio-based video description service consumes scarce bandwidth of an incremental audio channel. The transmission of audio content requires large bandwidth of approximately 100-400 kilobits per second. Such large bandwidth may be unavailable or, if available, may be expensive. In contrast, closed captioning is generally allocated a bandwidth of 9.6 kilobits per second, with an actual data space of approximately 1 kilobit per second. Therefore, to the extent the large bandwidth required for transmitting audio content may be unavailable, the audio-based video description service would be unavailable to visually-impaired users.

SUMMARY

Embodiments of the present invention provide for video description services providing text-based assistive program descriptions, particularly for visually-impaired users. Embodiments of the present invention provide for video description services that are less time-consuming and expensive in their production processes, while maintaining or even improving detail and accuracy of the content. Embodiments of the present invention provide for video description services that consume less bandwidth than conventional audio-based video description services during distribution to users.

According to an example embodiment of the present invention, a method of generating time-synchronous stage directions may provide for: creating, from a production script, a time-sequential list of dialogue streams and a time-sequential list of stage directions, matching the time-sequential list of dialogue streams to a list of closed-captioning streams, wherein dialogue time codes are associated with the closed-captioning streams, assigning the dialogue time codes associated with the closed-captioning streams to the matched dialogue streams, calculating stage direction time codes between consecutive dialogue time codes, on a basis of at least one of the consecutive dialogue time codes and a number of stage directions between consecutive dialogue streams, and assigning the calculated stage direction time codes to the time-sequential list of stage directions.

In one example variant of this embodiment, the matching step includes performing the matching via a loose-fitting matching algorithm.

In one example variant of this embodiment, the calculating step includes determining, for two consecutive dialogue time codes, a difference between the consecutive dialogue time codes, dividing the difference by one plus a number N of stage directions between consecutive dialogue streams associated with the two consecutive dialogue time codes to calculate a stage direction time code interval, multiplying the stage direction time code interval by a $z^{th}$ stage direction between the consecutive dialogue streams to calculate a $z^{th}$ stage direction time code interval, and adding the $z^{th}$ stage direction time code interval to an earlier time code of the consecutive dialogue time codes.

In one example embodiment of the method, the method may further provide for distributing the time-synchronous stage directions as text streams by at least one of vertical blanking systems, Internet stream systems, and DVD authoring.

In one example variant of this embodiment, the at least one of vertical blanking and Internet stream systems includes at least one of a CEA-608 closed captioning system, a CEA-708 closed captioning system, a World-System Teletext (WST) system, a Digital Video Broadcasting (DVB) system, and a timed-text system for multimedia (SMIL).

In one example embodiment of the method, the method may further provide for receiving the time-synchronous stage directions, and decoding the time-synchronous stage directions using a text-based system.

In one example variant of this embodiment, the text-based system includes at least one of a Braille device, a text-to-speech synthesizer, and a large-type on-screen display.

According to an example embodiment of the present invention, a method of providing descriptions of stage directions may provide for: creating textual descriptions of the stage directions of a production script, and transmitting the textual descriptions to a rendering system.

In one example embodiment of the method, the method may further provide for viewing at least one of a live production and a pre-recorded production including dialogue and the stage directions, in which the textual descriptions of the stage directions are based on the viewing of the production.

In one example embodiment of the method, the method may further provide for creating textual descriptions of the dialogue, and transmitting the textual descriptions of the dialogue to the rendering system, in which one of: the textual descriptions of the stage directions and the textual descriptions of the dialogue are transmitted to the rendering system via different transmission channels, and a code is included with the textual descriptions of the stage directions, the rendering system distinguishing between the textual descriptions of the stage directions and the textual descriptions of the dialogue based on the code.

In one example variant of this embodiment, the textual descriptions are transmitted as text streams by at least one of vertical blanking systems, data packet systems, and DVD authoring.

In one example variant of this embodiment, the at least one of vertical blanking and data packet systems includes at least one of a CEA-608 closed captioning system, a CEA-708 closed captioning system, a World-System Teletext (WST) system, a Digital Video Broadcasting (DVB) system, and a timed-text system for multimedia (SMIL).

In one example embodiment of the method, the method may further provide for receiving the textual descriptions together with a closed-captioning text stream, suppressing the textual descriptions from on-screen closed captioning displayed based on the closed-captioning text stream, and rendering the textual descriptions.

In one example variant of this embodiment, the textual descriptions are rendered by at least one of a Braille device, a text-to-speech synthesizer, and a large-type on-screen display.

According to an example embodiment of the present invention, a method of providing textual descriptions of stage directions may provide for: at least one of a) reading a production script, and b) viewing at least one of a live production and a pre-recorded production including dialogue and stage directions, creating audio descriptions of the stage directions, and converting the audio descriptions to textual descriptions of the stage directions using a voice-recognition system.

In one example embodiment of the method, the method may further provide for distributing the textual descriptions as text streams by at least one of vertical blanking systems, data packet stream systems, and DVD authoring.

In one example variant of this embodiment, the at least one of vertical blanking and data packet stream systems includes at least one of a CEA-608 closed captioning system, a CEA-708 closed captioning system, a World-System Teletext (WST) system, a Digital Video Broadcasting (DVB) system, and a timed-text system for multimedia (SMIL).

In one example embodiment of the method, the method may further provide for receiving the textual descriptions of the stage directions, and decoding the textual descriptions via a rendering system.

In one example variant of this embodiment, the rendering system includes at least one of a Braille device, a text-to-speech synthesizer, and a large-type on-screen display.

According to an example embodiment of the present invention, a method of using textual descriptions to provide assistive program descriptions to visually-impaired consumers may provide for: transmitting a stream of textual descriptions of stage directions for at least one of a live production and a pre-recorded production, and rendering the stream of textual descriptions of stage directions via at least one of a Braille device, a text-to-speech synthesizer, and a large-type on-screen display.

DETAILED DESCRIPTION OF EXAMPLE EMBODIMENTS

Figure 1:
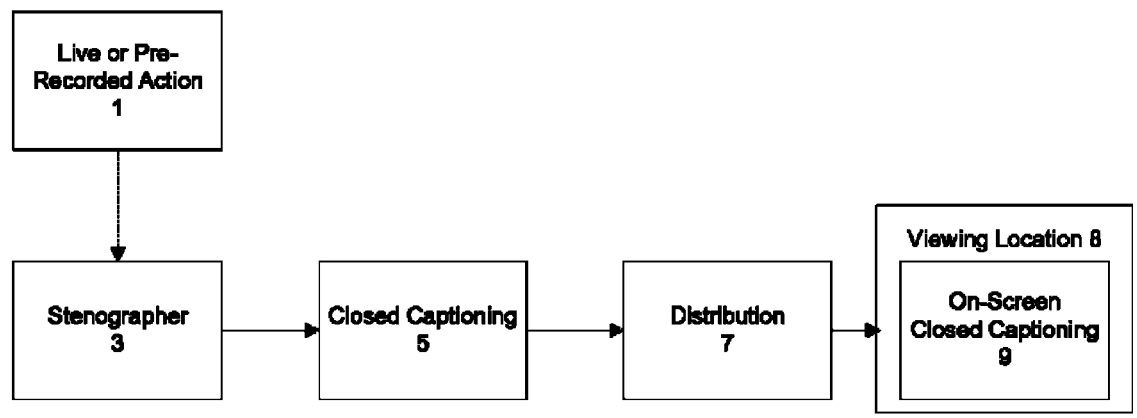
FIG. 1 is a diagram illustrating components of a conventional closed-captioning system.
Figure 2:
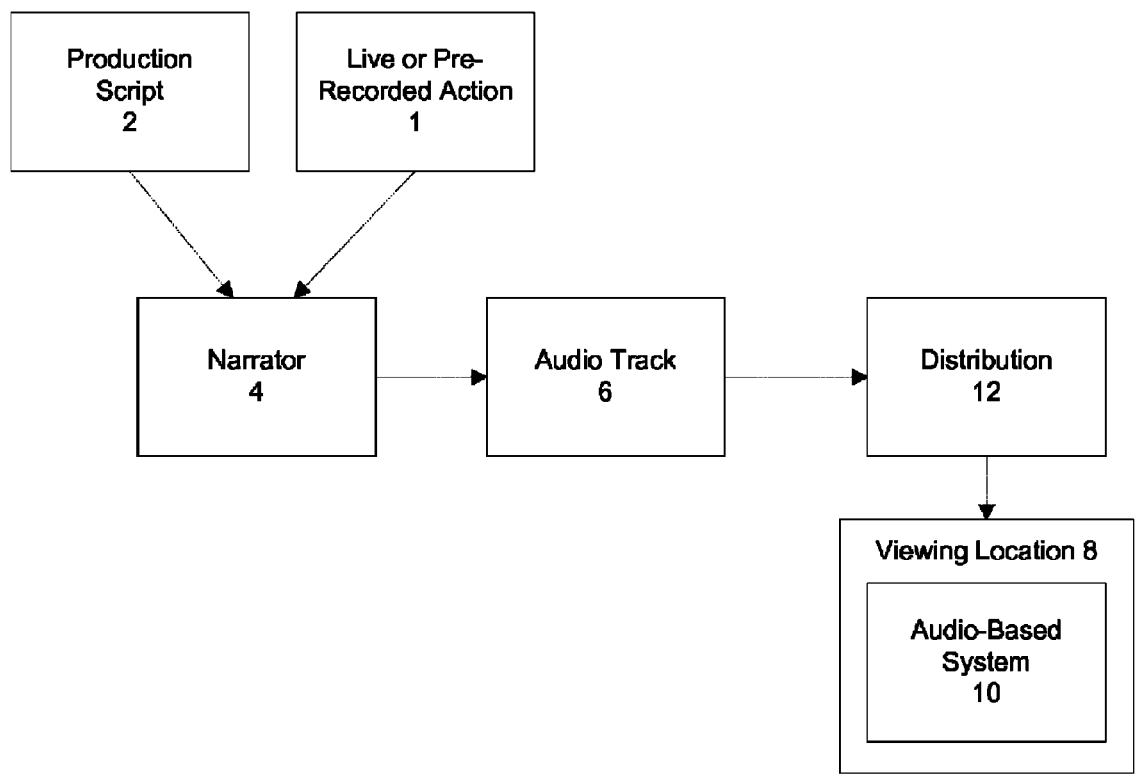
FIG. 2 is a diagram illustrating components of a conventional audio-based video description service.
Figure 3:
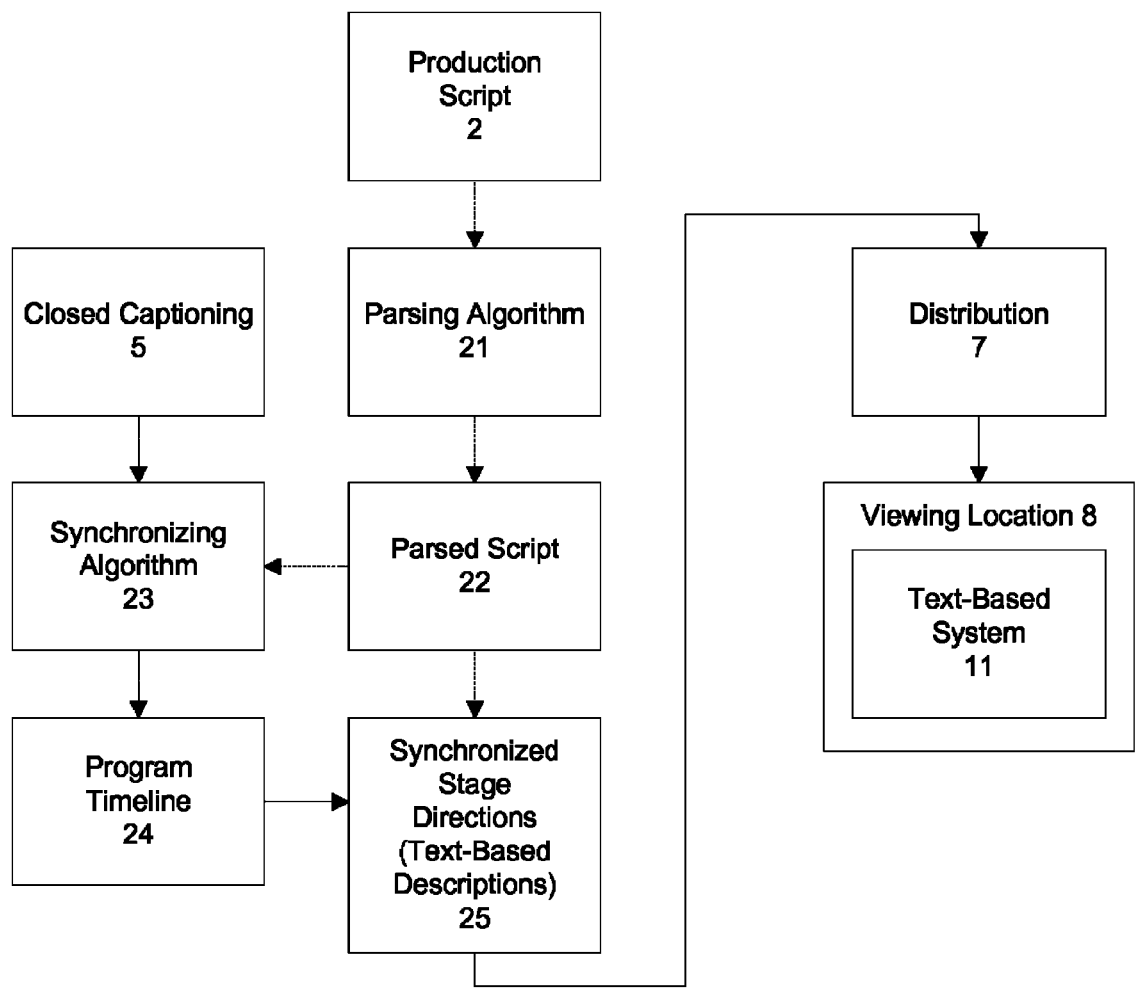
FIG. 3 is a diagram illustrating components of a text-based video description service using script-based parsing and synchronizing algorithms, according to an example embodiment of the present invention.
Figure 4:
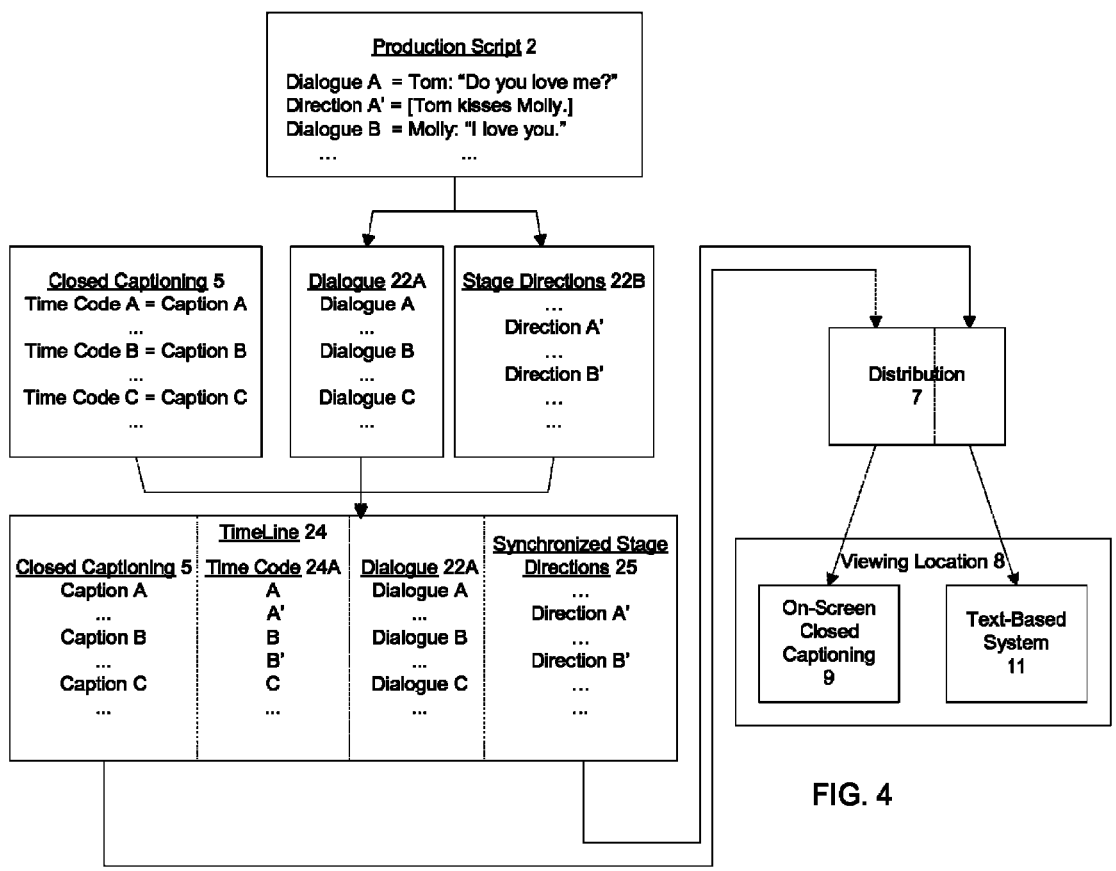
FIG. 4 is a diagram illustrating further detailed components of the text-based video description service of FIG. 3, according to an example embodiment of the present invention.

FIG. 3 illustrates components of a text-based video description service using script-based parsing and synchronizing algorithms, according to an example embodiment of the present invention. A production script 2 generally includes two primary elements: dialogue and stage directions. Dialogue is that portion of the production script 2 that represents the dialogue in which actors are to engage during a program. This may include spoken words, such as, for example, "I love you," spoken by an actor, as shown in FIG. 4. Stage directions are that portion of the production script 2 that represents the directions that the actors and/or set structures are to follow during a program. This may include actions of an actor, such as, for example, a direction of [Tom kisses Molly], as shown in FIG. 4. A production script 2 may include other elements, such as technical directions for cameras, lighting, etc.; however, such other elements are not discussed herein in further detail.

Production scripts 2 generally follow certain formatting conventions of script writing. For example, to indicate dialogue, an actor's name followed by a colon (e.g., Tom:) may appear centered on the page immediately prior to the dialogue for that actor. This and other formatting conventions may be followed to indicate dialogue and stage directions. In particular, dialogue and stage directions may be indicated by different formatting conventions within a production script 2, in order to differentiate these elements from each other. By recognizing the formatting conventions used in a production script 2, a parsing algorithm 21 may be used to parse an electronic copy of a production script 2 into a parsed script 22 having two separate lists, one containing the dialogue, and the other containing the stage directions.

As discussed above, closed captioning 5 includes dialogue streams that have been recorded by a stenographer 3 listening to a live or pre-recorded production 1. Further, dialogue stream portions of the closed captioning 5 may be associated with a time code. The time code may set out the sequential order of all the dialogue streams of the closed captioning 5.

A synchronizing algorithm 23 may be used to synchronize the list of dialogue of the parsed script 22 with the dialogue streams of the closed captioning 5. Since the dialogue streams of the closed captioning 5 may not exactly match the dialogue of the parsed script 22 for a variety of reasons, such as editing, improvisation, and others, the synchronizing algorithm 23 may use an "approximate" matching of the parsed script 22 and the closed captioning 5. In this manner, the synchronizing algorithm 23 creates a program timeline 24.

The stage directions of the parsed script 22 may be synchronized with the program timeline 24, resulting in synchronized stage directions 25. The synchronized stage directions 25 are text-based descriptions, which are then distributed 7 to users, as more fully described below with regard to FIG. 7. Further, when users receive the synchronized stage directions 25 at a viewing location 8, the text-based descriptions may be decoded using any suitable text-based system 11, as more fully described below with regard to FIG. 8.

FIG. 4 illustrates further detailed components of the text-based video description service of FIG. 3, according to an example embodiment of the present invention. A parsing algorithm 21 may parse an electronic copy of a production script 2 into dialogue 22A and stage directions 22B. A production script 2 and its associated closed captioning 5 may include any number of dialogues and stage directions intermixed with each other. As shown in FIG. 4, dialogue 22A may include, for example, dialogue A, dialogue B, and dialogue C. In addition, stage directions 22B may include, for example, direction A' and direction B'. Direction A' is shown as occurring between dialogues A and B, and direction B' is shown as occurring between dialogues B and C. Further, as shown in FIG. 4, closed captioning 5 may include, for example, caption A at time code A, caption B at time code B, and caption C at time code C.

A synchronizing algorithm 23 may synchronize the dialogue 22A with the closed captioning 5 by matching each dialogue A, B, C with its associated caption A, B, C. As more fully set forth above, since the dialogue 22A may not exactly match the closed captioning 5 for a variety of reasons, an "approximate" matching may be used. Any suitably appropriate loose-fitting matching algorithm may be used to find the approximate matches. As each dialogue A, B, C is matched with its associated caption A, B, C, each dialogue is also assigned the time code 24A of its associated caption. For example, as dialogue A is matched with caption A, dialogue A is assigned time code A; as dialogue B is matched with caption B, dialogue B is assigned time code B; as dialogue C is matched with caption C, dialogue C is assigned time code C. By matching the dialogue 22A with the closed captioning 5, a program timeline 24 is created.

The stage directions 22B may be synchronized to the program timeline 24. In the example shown in FIG. 4, since direction A' occurs between dialogues A and B, direction A' is assigned a time code A' between the time codes A, B for dialogues A, B. In addition, since direction B' occurs between dialogues B and C, direction B' is assigned a time code B' between the time codes B, C for dialogues B, C. Further, for this step, a time insertion algorithm may be used to determine the time codes for stage directions 22B. For the case in which a single stage direction A' occurs between two dialogue time codes A and B, the time insertion algorithm may be expressed, for example, as:

$$\text{Stage Direction Time Code } A' = \text{Dialogue Time Code } A + \left(\frac{\text{Dialogue Time Code } B - \text{Dialogue Time Code } A}{2}\right),$$

where 2 is the number of units of time in which the time codes are expressed.

As can be seen from the above insertion time algorithm, a single stage direction A' occurring between dialogues A and B is inserted at a stage direction time code A' that is halfway between corresponding dialogue time codes A and B.

The above equation can be extended to be applied in cases in which one or more stage directions occur between two dialogue time codes A and B. The extended equation may be expressed as:

$$\text{Stage Direction Time Code } A'_z = \text{Dialogue Time Code } A + z\left(\frac{\text{Dialogue Time Code } B - \text{Dialogue Time Code } A}{N+1}\right),$$

in which N is the number of stage directions occurring between dialogues A and B, and z is a particular one of the N stage directions. For example, in a case in which three stage directions occur between dialogue A and dialogue B, N is assigned a value of 3. Then, using the above insertion time algorithm to determine the stage direction time code of a particular one of the three stage directions between dialogues A and B, z is assigned a value of 1, 2, or 3. Thus, for the first stage direction $A'_1$ between dialogues A and B, z is assigned the value of 1. Correspondingly, for the second stage direction $A'_2$ between dialogues A and B, z is assigned the value of 2, and for the third stage direction $A'_3$ between dialogues A and B, z is assigned the value of 3. Using the above insertion time algorithm, the N stage directions may be assigned time codes that are equally spaced between dialogues A and B, between which all N stage directions occur.

As can be seen from an analysis of the above two algorithms, the first simpler algorithm is a special case of the second algorithm, in which the values of N and z are both 1. For the example shown in FIG. 4, with the above insertion time algorithm, stage direction time codes A', B' may be assigned to directions A', B', resulting in stage directions 25 that are synchronized relative to the captions A, B, C. Specifically, direction A' is assigned time code A' occurring between captions A and B, and direction B' is assigned time code B' occurring between captions B and C.

In an alternative example embodiment, the dialogue may be used as the closed captioning content, in which case the initial step of matching dialogues to closed captioning may be omitted.

The synchronized stage directions 25 are text-based descriptions, which are distributed 7 to users, as more fully described below with regard to FIG. 7. Further, when users receive the synchronized stage directions 25 at a viewing location 8, the text-based descriptions may be decoded using any suitable text-based system 11, as more fully described below with regard to FIG. 8.

Accordingly, in an example embodiment of the present invention, a production script is parsed into a parsed script including separate lists of dialogue and stage directions by a parsing algorithm. Then, the parsed script is synchronized to closed captioning by a synchronizing algorithm, producing a program timeline. Then, the parsed script and program timeline are synchronized, resulting in text-based stage directions that are synchronized with a program's audio content. The resultant synchronized stage directions are then distributed to a receiving location, at which the text-based descriptions may be decoded and rendered as described below.

The above-described parsing and synchronizing algorithms of FIGS. 3 and 4 may be performed in real-time while a production is broadcast to users. Alternatively, the algorithms may be performed prior to broadcast using a pre-recorded closed-captioning program. In addition, the algorithms may generally be performed at a broadcaster site, which is typically where the production script is located. However, the algorithms may be performed at any location at which an electronic copy of the production script and closed captioning are available.

Figure 5:
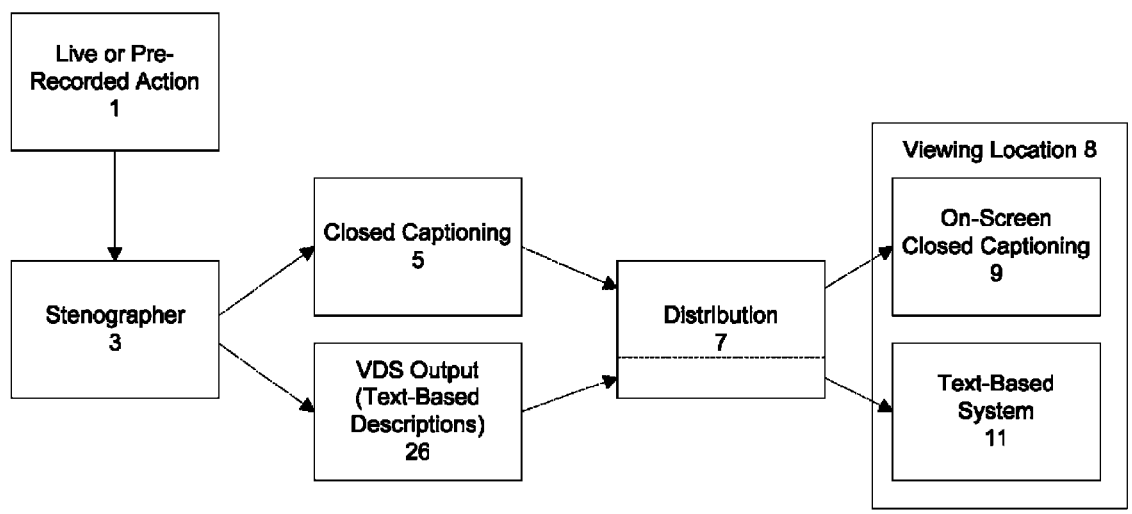
FIG. 5 is a diagram illustrating components of a text-based video description service in parallel with a closed-captioning system, according to an alternative example embodiment of the present invention.

FIG. 5 illustrates components of a text-based video description service in parallel with a closed-captioning system, according to an alternative example embodiment of the present invention. As described above, in a traditional closed captioning system, a stenographer 3 listens to a live or pre-recorded production 1 and records the closed captioning stream 5. The closed captioning stream 5 may then be distributed to users by closed captioning systems, and when viewing a particular program at a viewing location 8, the program may then be displayed together with the on-screen closed captioning 9.

As shown in FIG. 5, the existing closed captioning system may be enhanced by adding to a closed captioning channel, e.g., cc-2, an additional and separate channel, e.g., cc-4, for transmission of video descriptions. The receiver can then output these separate data via separate devices. In such an enhanced system, the stenographer 3 would not only listen to, but also watch, the live or pre-recorded production 1. As the stenographer 3 both listens to and watches a program, the stenographer 3 may record a separate video description service (VDS) output 26, describing the events, actions, locations, expressions, and other video content, i.e., stage directions, in parallel to and simultaneously with the closed captioning stream 5.

Instead of the addition of a separate channel for the video description service, the VDS output may be integrated with the closed captioning output, but may be distinguished from the closed captioning output by use of separate codes, e.g., separate leading codes prior to each entry or prior to each first entry after a switch between closed captioning and VDS output. The rendering device at the user end may then determine which text is a video description based on the VDS tags.

The VDS output includes text-based descriptions, which are then distributed 7 to users, as more fully described below with regard to FIG. 7. However, when users receive the VDS output 26 at a viewing location 8, it may be suppressed from the normal on-screen display of closed captioning 9, and instead, the VDS output may be redirected to a text-based system 11. The text-based descriptions may be decoded using any suitable text-based system 11, as more fully described below with regard to FIG. 8. Further, if VDS output 26 is recorded using a separate channel from closed captioning 9, users may directly output the VDS output 26 by an output device separate from that used for the output of closed captioning 9. For example, closed captioning 9 may be output to one speaker, and VDS output 26 may be output to another, separate speaker, such that a user may listen to both outputs simultaneously.

Figure 6:
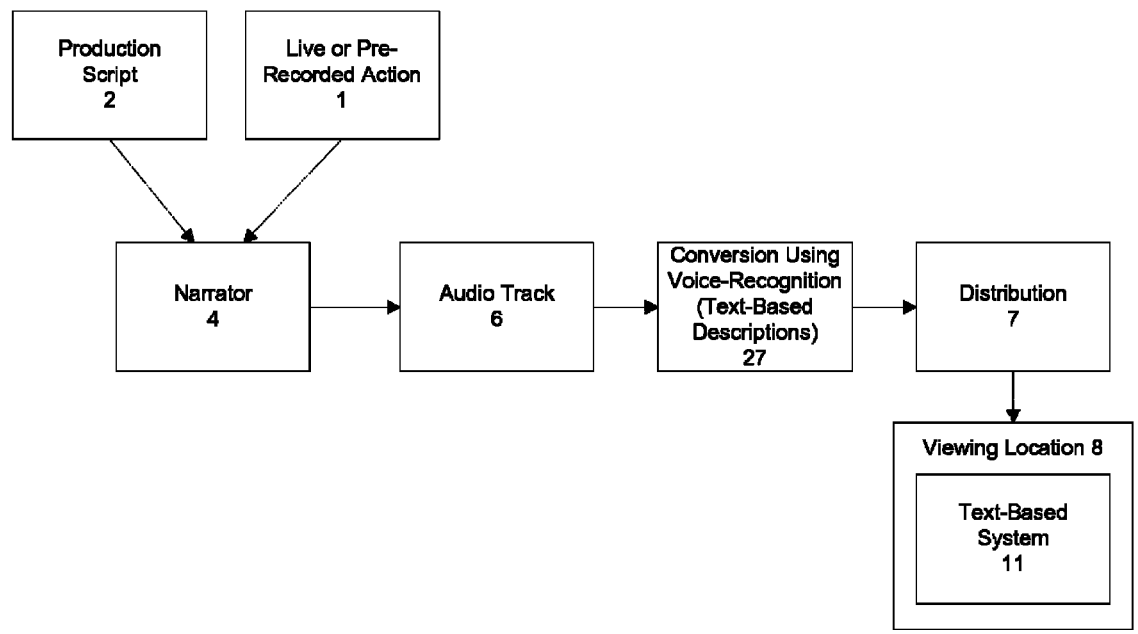
FIG. 6 is a diagram illustrating components of a text-based video description service using a voice-recognition system, according to another alternative example embodiment of the present invention.

FIG. 6 illustrates components of a text-based video description service using a voice-recognition system, according to another alternative example embodiment of the present invention. As described above, in an audio-based description service, a narrator 4 records an audio track 6 of video content while either reading a production script 2 or viewing a live or pre-recorded production 1. The audio track 6 may then be distributed 12 to users by traditional audio broadcast methods, and when listening to a particular program at a viewing location 8, the program may then be played together with the audio track 6.

As shown in FIG. 6, the existing audio-based description service may be enhanced by converting the audio track 6 into text-based descriptions 27 using voice-recognition software and/or systems. Any voice recognition software or system may be used for the conversion from audio-based descriptions to text-based descriptions. As more fully set forth above, the resulting text-based descriptions require less bandwidth for distribution than the original audio-based descriptions. Further, non-professional narrators may be more readily employed, reducing the costs of production. Moreover, even if professional narrators are employed to create the audio-based descriptions, the costs of such production may still be reduced since the narrators' recorded, actual voices are not being distributed to users.

The converted audio-based descriptions are text-based descriptions 27, which are then distributed 7 to users, as more fully described below with regard to FIG. 7. Further, when users receive the text-based descriptions 27 at a viewing location 8, the text-based descriptions may be decoded using any suitable text-based system 11, as more fully described below with regard to FIG. 8. The timing of the output may be based on the timing in which the audio-based descriptions are provided for conversion to text-based descriptions.

Figure 7:
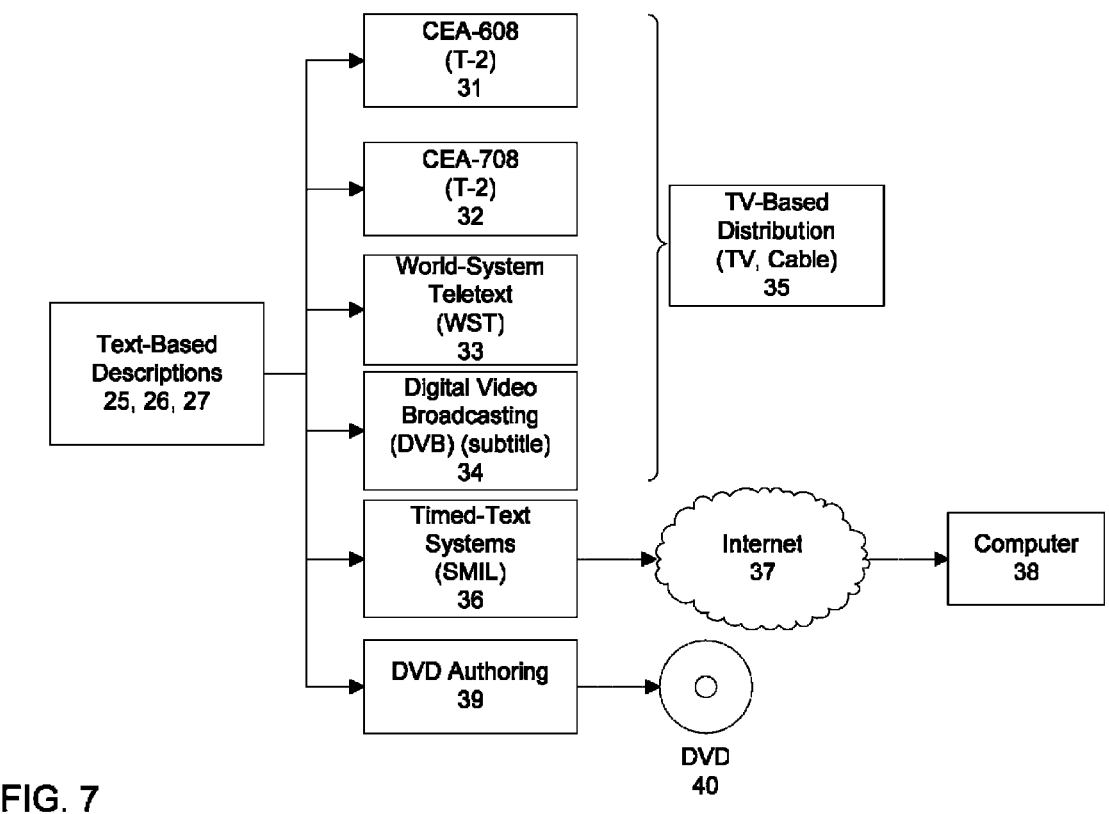
FIG. 7 is a diagram illustrating components of a distribution system for a text-based video description service, according to an example embodiment of the present invention.

FIG. 7 illustrates components of a distribution system for a text-based video description service, according to an example embodiment of the present invention. The text-based descriptions 25, 26, 27 may be inserted into the text service stream of vertical blanking or data-type streams. Examples of systems that provide such streams include CEA-608 (T-2) closed captioning systems 31, CEA-708 (T-2) closed captioning systems 32, World-System Teletext (WST) 33 used internationally, Digital Video Broadcasting (DVB) subtitle streams 34, or timed-text systems 36 used on the Internet 37 for multimedia such as SMIL. The closed captioning systems 31 and 32, WST 33, and DVB 34 are television-based distribution systems 35 that may be distributed by television, cable, or other transmission methods. The timed-text systems 36 are computer-based distribution systems 38 that may be distributed over the Internet 37 or via other methods. Further, the text-based descriptions 25, 26, 27 may undergo a DVD authoring process 39, or other storage media production process, and be distributed via a DVD 40, or other storage media.

In the example of CEA-608 closed captioning systems 31, the T-2 (Text service, channel 2) is transported on VBI (vertical blanking interval) field-1, Line-21 with closed captioning and interleaved in its data stream of approximately 120 bits per second, which is adequate for text transmission of the nature described herein. Therefore, the text service consumes far less bandwidth than audio. In fact, the transmission of CEA-608, for example, has permanently allocated bandwidth in both the VBI and MPEG-compressed domains, whether or not it is used. Thus, no incremental bandwidth is required to transmit a text-based video description service along this permanently allocated bandwidth.

Figure 8:
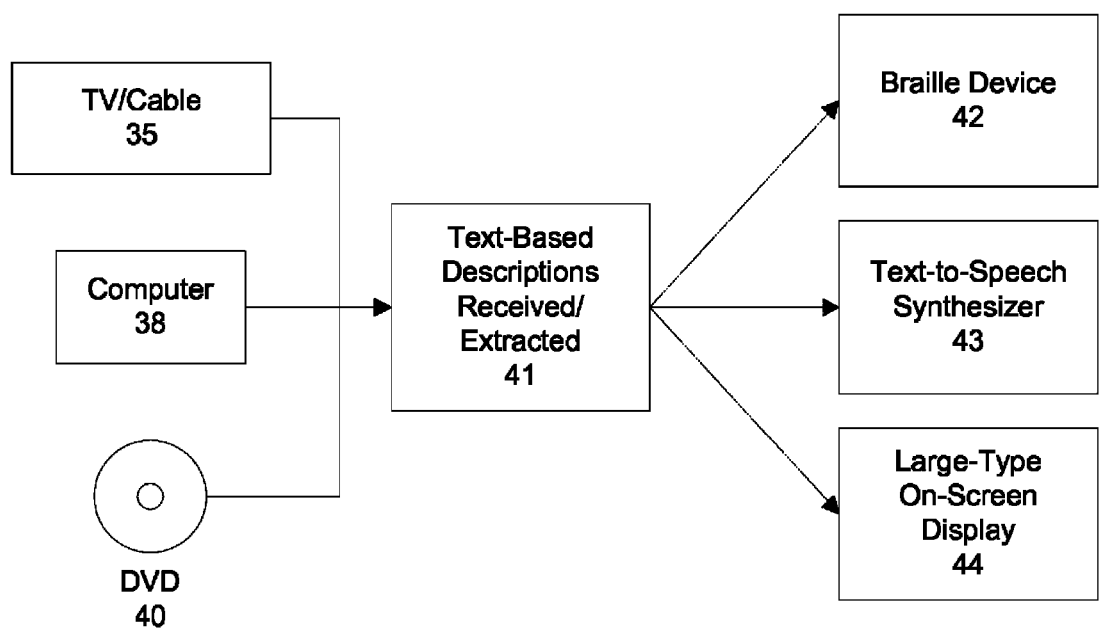
FIG. 8 is a diagram illustrating components of a viewing location for a text-based video description service, according to an example embodiment of the present invention.

FIG. 8 illustrates components of a viewing location for a text-based video description service, according to an example embodiment of the present invention. The text-based descriptions 25, 26, 27 may be received via television-based distribution systems 35, computer-based distribution systems 38, storage media 40, or other distribution systems. The received text-based descriptions are then extracted from the received data stream (the extracted descriptions being designated as 40 in FIG. 8). For example, using reception methods, such as over-the-air television, cable set-top-box, or other similar methods, the data stream may either be received internally by a set-top-box, or a video signal, such as an analog baseband NTSC, may be used to extract the text-based descriptions 41.

The received and extracted text-based descriptions 41 may then be decoded by various devices to "render" the text to visually-impaired users. For example, the text-based descriptions 41 may processed by a Braille device 42 that presents the text-based descriptions 41 to a visually-impaired user in the "raised-dot" format. Then, the user may read the text-based descriptions 41 from the Braille device while also listening to the regular audio content of the program. Depending on its structure, the text-based descriptions 41 may have a prefix for punctuation or other text-friendly characters that may not be optimal for text-to-speech, but which may be appropriate for such a Braille device.

In addition or alternatively, the text-based descriptions 41 may be processed by a text-to-speech synthesizer 43 that converts the text-based descriptions 41 to spoken words. Then, the user may listen to the converted spoken version of the text-based descriptions 41 while also listening to the regular audio content of the program. Depending on its structure, some additional characters or phonetic spelling of the text-based descriptions 41 may be tagged for specific use by a text-to-speech system in order to more accurately pronounce names or obscure words.

Further, for partially-sighted users, the text-based descriptions 41 may be processed and displayed on a large-type, on-screen display device 44. Then, a partially-sighted user may read the displayed, large-type text of the text-based descriptions 41 while also listening to the regular audio content of the program.

When using a text-to-speech synthesizer 43, it may occur that the converted spoken words of the text-based descriptions 41 are aurally output at the same time as regular audio content of the program. This situation should generally be avoided in order to prevent superimposing the two audio outputs on top of each other, although it may be possible for a user to listen to simultaneous outputs from the text-to-speech synthesizer 43 and the regular audio content of the program. When using a Braille device 42 or a large-type, on-screen display device 44, however, no such potential audio superimposition problem exists since a user may be able to read from a Braille device 42 or a large-type, on-screen display device 44 while also listening to the regular audio content of the program.

An example embodiment of the present invention is directed to one or more processors, which may be implemented using any conventional processing circuit and device or combination thereof, e.g., a Central Processing Unit (CPU) of a Personal Computer (PC), to execute code provided, e.g., on a hardware-implemented computer-readable medium, to perform the example methods described above, or portions thereof. The computer-readable medium may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware-implemented computer readable mediums having stored thereon instructions, which, when executed, cause one or more processors to perform the example methods described above, or portions thereof.

An example embodiment of the present invention is directed to a method of transmitting instructions executable by one or more processors, the instructions, when executed, causing the processor(s) to perform the example methods described above, or portions thereof.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of generating time-synchronous stage directions, comprising the steps of:

for a production script from which a time-sequential list of stage directions and a time-sequential list of dialogue streams are obtained, matching the time-sequential list of dialogue streams to a list of closed-captioning streams, wherein dialogue time codes are associated with the closed-captioning streams;

assigning the dialogue time codes associated with the closed-captioning streams to the matched dialogue streams;

calculating, by a computer processor, stage direction time codes between consecutive dialogue time codes, on a basis of at least one of the consecutive dialogue time codes and a number of stage directions between consecutive dialogue streams;

assigning, by the processor, the calculated stage direction time codes to the time-sequential list of stage directions; and providing the time-sequential list of stage directions for rendering in synchronization with a rendering of the program, the synchronization being based on the assigned stage direction time codes.

2. The method of claim 1, further comprising the step of:
distributing the time-synchronous stage directions as text streams by at least one of vertical blanking systems, Internet stream systems, and DVD authoring.

3. The method of claim 2, wherein the at least one of vertical blanking and Internet stream systems includes at least one of a CEA-608 closed captioning system, a CEA-708 closed captioning system, a World-System Teletext (WST) system, a Digital Video Broadcasting (DVB) system, and a timed-text system for multimedia (SMIL).

4. The method of claim 1, further comprising the steps of:
receiving the time-synchronous stage directions; and
decoding the time-synchronous stage directions using a text-based system.

5. The method of claim 4, wherein the text-based system includes at least one of a Braille device, a text-to-speech synthesizer, and a large-type on-screen display.

6. The method of claim 1, wherein the time-sequential list of stage directions and the closed-captioning streams are provided via different transmission channels.

7. The method of claim 1, wherein the matching step includes performing the matching via a loose-fitting matching algorithm.

8. The method of claim 1, wherein the calculating step includes:
determining, for two consecutive dialogue time codes, a difference between the consecutive dialogue time codes;
dividing the difference by one plus a number N of stage directions between consecutive dialogue streams associated with the two consecutive dialogue time codes to calculate a stage direction time code interval;
multiplying the stage direction time code interval by a $z^{th}$ stage direction between the consecutive dialogue streams to calculate a $z^{th}$ stage direction time code interval; and
adding the $z^{th}$ stage direction time code interval to an earlier time code of the consecutive dialogue time codes.

9. A non-transitory computer-readable medium having stored thereon instructions executable by a processor, the instructions which, when executed by the processor, cause the processor to perform a method of generating time-synchronous stage directions, the method comprising the steps of:

for a production script of a program from which a time-sequential list of stage directions and a time-sequential list of dialogue streams are obtained, matching the time-sequential list of dialogue streams to a list of closed-captioning streams, wherein dialogue time codes are associated with the closed-captioning streams;

assigning the dialogue time codes associated with the closed-captioning streams to the matched dialogue streams;

calculating stage direction time codes between consecutive dialogue time codes, on a basis of at least one of the consecutive dialogue time codes and a number of stage directions between consecutive dialogue streams;

assigning the calculated stage direction time codes to the time-sequential list of stage directions; and providing the time-sequential list of stage directions for rendering in synchronization with a rendering of the program, the synchronization being based on the assigned stage direction time codes.

10. A computer system for generating time-synchronous stage directions, the system comprising:
a computer processor configured to:
for a production script of a program from which a time-sequential list of stage directions and a time-sequential list of dialogue streams are obtained, match the time-sequential list of dialogue streams to a list of closed-captioning streams, wherein dialogue time codes are associated with the closed-captioning streams;

assign the dialogue time codes associated with the closed-captioning streams to the matched dialogue streams;

calculate stage direction time codes between consecutive dialogue time codes, on a basis of at least one of the consecutive dialogue time codes and a number of stage directions between consecutive dialogue streams;

assign the calculated stage direction time codes to the time-sequential list of stage directions; and provide the time-sequential list of stage directions for rendering in synchronization with a rendering of the program, the synchronization being based on the assigned stage direction time codes.

* * * * *